US010509755B2

(12) United States Patent
Yang et al.

(10) Patent No.: US 10,509,755 B2
(45) Date of Patent: Dec. 17, 2019

(54) AUTOMATIC SWITCHING APPARATUS AND AUTOMATIC SWITCHING METHOD

(71) Applicant: ATEN International Co., Ltd., New Taipei (TW)

(72) Inventors: Shang-Yi Yang, New Taipei (TW); Sin-Hong Chen, New Taipei (TW); Tze-an Shen, New Taipei (TW)

(73) Assignee: ATEN International Co., Ltd., New Taipei (TW)

(*) Notice: Subject to any disclaimer, the term of this patent is extended or adjusted under 35 U.S.C. 154(b) by 0 days.

(21) Appl. No.: 15/896,822

(22) Filed: Feb. 14, 2018

(65) Prior Publication Data

US 2018/0239732 A1 Aug. 23, 2018

(30) Foreign Application Priority Data

Feb. 23, 2017 (TW) .............................. 106106167 A (51) Int. Cl.
| | | |
|---|---|---|
| *G06F 11/30* | (2006.01) | |
| *G06F 13/40* | (2006.01) | |
| *G06F 3/14* | (2006.01) | |
| *G06F 3/038* | (2013.01) | |
| *G06F 13/38* | (2006.01) | |
| *G09G 5/00* | (2006.01) | |

(52) U.S. Cl.
CPC .......... *G06F 13/4022* (2013.01); *G06F 3/038* (2013.01); *G06F 3/14* (2013.01); *G06F 13/385* (2013.01); *G09G 5/006* (2013.01); *G09G 2370/14* (2013.01); *G09G 2370/22* (2013.01); *G09G 2370/24* (2013.01)

(58) Field of Classification Search
None
See application file for complete search history.

(56) References Cited

U.S. PATENT DOCUMENTS

| | | | | |
|---|---|---|---|---|
| 2001/0005895 A1* | 6/2001 | Shimura | ................ | G04G 19/08 |
| | | | | 713/320 |
| 2002/0051153 A1* | 5/2002 | Hiyama | ................... | G09G 3/20 |
| | | | | 358/1.9 |
| 2004/0125703 A1* | 7/2004 | Ibuka | ....................... | H04B 1/20 |
| | | | | 369/2 |
| 2009/0176541 A1* | 7/2009 | Okajima | ................ | H01Q 1/243 |
| | | | | 455/575.3 |

(Continued)

FOREIGN PATENT DOCUMENTS

| | | |
|---|---|---|
| CN | 105656471 A | 6/2016 |
| TW | M515132 U | 1/2016 |

OTHER PUBLICATIONS

Taiwanese Office Action, dated Sep. 27, 2017, in a counterpart Taiwanese patent application, No. TW 106106167.

*Primary Examiner* — Hyun Nam
(74) *Attorney, Agent, or Firm* — Chen Yoshimura LLP (57) ABSTRACT

An automatic switching apparatus and an automatic switching method are disclosed. The automatic switching apparatus includes a universal serial bus Type-C input connector, a plurality of main links, at least one video output connector and at least one USB output connector. The automatic switching method includes the steps of: (a) detecting a use state of the plurality of main links; and (b) automatically switching the specification of the at least one USB output connector.

22 Claims, 4 Drawing Sheets

(56) References Cited

U.S. PATENT DOCUMENTS

| | | | |
|---|---|---|---|
| 2010/0073353 A1* | 3/2010 | Muramatsu | G09G 3/3611 |
| | | | 345/213 |
| 2011/0140652 A1* | 6/2011 | Chandran | H02J 7/0042 |
| | | | 320/107 |
| 2012/0281062 A1* | 11/2012 | Gu | H04N 21/440263 |
| | | | 348/14.12 |
| 2013/0055579 A1* | 3/2013 | Hayashi | G01B 3/22 |
| | | | 33/784 |
| 2016/0156137 A1 | 6/2016 | Pan et al. | |
| 2017/0046289 A1* | 2/2017 | Hundal | G06F 13/385 |
| 2017/0357152 A1* | 12/2017 | Ashitani | G03B 31/00 |
| 2018/0137833 A1* | 5/2018 | Hundal | G06F 13/385 |
| 2019/0082141 A1* | 3/2019 | Chen | H04N 7/104 |

* cited by examiner

AUTOMATIC SWITCHING APPARATUS AND AUTOMATIC SWITCHING METHOD

BACKGROUND OF THE INVENTION

Field of the Invention

This invention relates to data transmission, and in particular, it relates to an automatic switching apparatus and related automatic switching method used in data transmission.

Description of Related Art

After the DisplayPort Alternate Mode applicable to Universal Serial Bus (USB) Type-C standard was released in September of 2014, users can use a USB Type-C cable to simultaneously transmit video data from a video source device and USB data respectively to a display device and a USB device.

However, after the user completes an initial setting of the use situation for a display device (such as setting the display resolution), if the user wishes to change to a different use situation (such as to change from a high display resolution to a low display resolution or vice versa), the user needs to manually re-set the docking station and unplug and then re-plug in the USB Type-C cable, in order to complete the change to a different use situation. This operation is cumbersome and inconvenient in practice.

SUMMARY

Accordingly, the present invention is directed to an automatic switching device and automatic switching method which substantially obviates one or more of the problems due to limitations and disadvantages of the related art.

An embodiment of the present invention provides an automatic switching method. In this embodiment, the automatic switching method is performed by an automatic switching device. The automatic switching device includes an USB Type-C input connector, a plurality of main links, at least one video output connector, and at least one USB output connector. The automatic switching method includes the following steps: (a) detecting a use state of the plurality of main links; and (b) based on the detecting result of step (a), automatically changing the specification of the at least one USB output connector.

In one embodiment, the at least one video output connector includes a DisplayPort connector, configured for coupling to a display device, and wherein the plurality of main links include four pairs of differential signal lines, the four pairs of differential signal lines being coupled to the DisplayPort connector.

In one embodiment, the detecting result form step (a) specifies a number N of pairs of differential signal lines among the four pairs of differential signal lines that are currently used to transmit video data, wherein N equals 1, 2, or 4.

In one embodiment, when N equals 1 or 2, which indicates a first use situation where a low display resolution is used for image display, step (b) includes automatically changing the communication specification of the at least one USB output connector to USB 3.0 specification.

In one embodiment, when N equals 4, which indicates a second use situation where a high display resolution is used for image display, step (b) includes automatically changing the communication specification of the at least one USB output connector to USB 2.0 specification.

In one embodiment, the automatic switching device further comprises a controller and a configuration channel, wherein the controller is coupled to the USB Type-C input connector, the four pairs of differential signal lines and the at least one USB output connector, and wherein the configuration channel is coupled between the USB Type-C input connector and the controller.

In one embodiment, step (b) includes, based on the detecting result from step (a), controlling the configuration channel to re-perform communication between the USB Type-C input connector and the controller to automatically change the communication specification of the at least one USB output connector.

In one embodiment, where the automatic switching device further comprises an active control unit coupled to the configuration channel, and wherein step (b) includes the active control unit controlling the configuration channel to re-perform the communication.

In one embodiment, the active control unit includes a microprocessor unit (MCU), a central processing unit (CPU), or a field-programmable gate array (FPGA).

In one embodiment, the USB Type-C input connector is coupled to an external electronic device, and wherein step (b) includes the external electronic device executing an application program to control the configuration channel to re-perform the communication.

In one embodiment, the automatic switching device is a docking station, operating under a DisplayPort Alternate Mode, for receiving video data and USB data via the USB Type-C input connector, and transmitting the video data and the USB data respectively via the at least one video connector and at the least one USB output connector.

In another aspect, the present invention provides an automatic switching device, which includes a Universal Serial Bus (USB) Type-C input connector, at least one video output connector, at least one USB output connector, and a plurality of main links. The USB Type-C input connector, disposed at an input side of the automatic switching device. The at least one video output connector is disposed at an output side of the automatic switching device. The at least one USB output connector is disposed at the output side of the automatic switching device. The plurality of main links are coupled between the USB Type-C input connector and the at least one video output connector. The automatic switching device is configured to, based on a use state of the plurality of main links, automatically changing a communication specification of the at least one USB output connector.

Compared to conventional technologies, by using the automatic switching device and automatic switching method according to embodiments of the present invention, the user does not need to manually perform the complex process of re-setting and unplugging/re-plugging the transmission cables, and the device can automatically accomplish switching of the use situations when the user adjusts the resolution of the display device. This not only effectively simplifies the operation process and shorten operation time, but also provides convenience to the user in practical use.

It is to be understood that both the foregoing general description and the following detailed description are exemplary and explanatory and are intended to provide further explanation of the invention as claimed.

DETAILED DESCRIPTION OF PREFERRED EMBODIMENTS

An embodiment of the present invention provides an automatic switching device. In this embodiment, the automatic switching device is used for, without limitation, USB Type-C transmission. For example, the automatic switching device may be a docking station, used under the DisplayPort Alternate Mode, to receive video data and USB data via a USB Type-C input connector, and transmit video data and USB data respectively via at least one video connector and at least one USB output connector.

Figure 1:
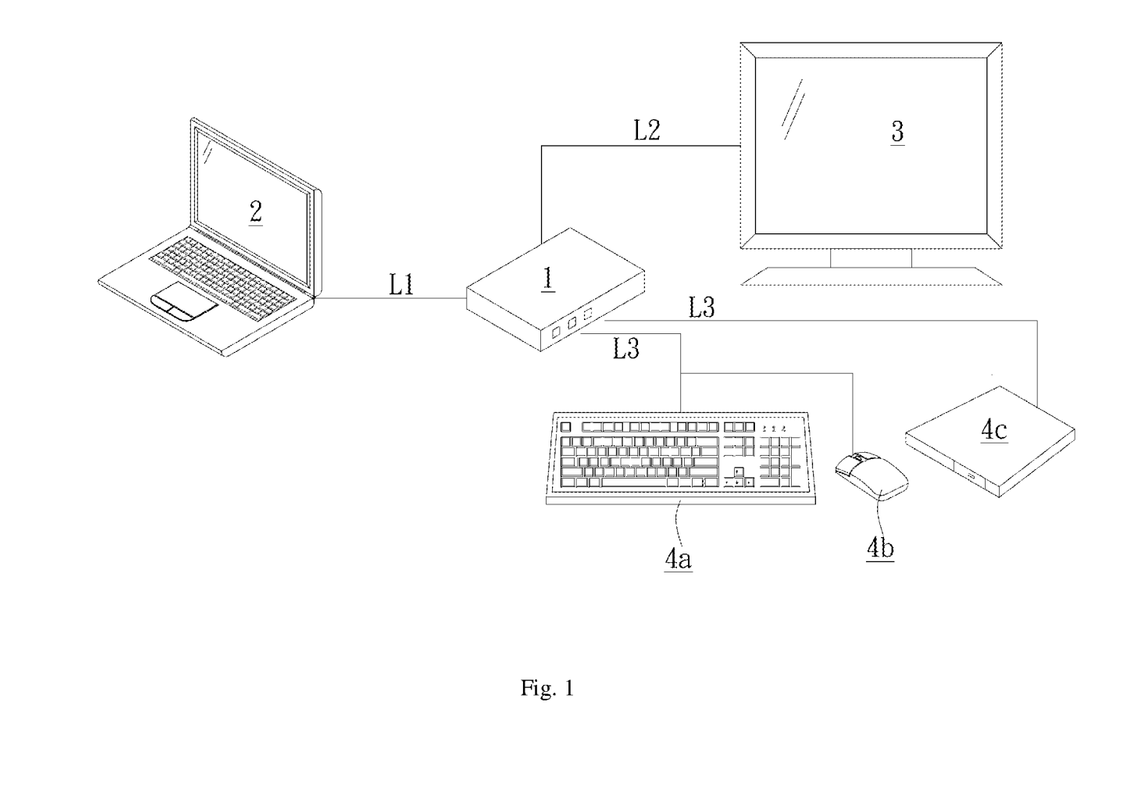
FIG. 1 schematically illustrates a system employing an automatic switching device according to an embodiment of the present invention.

Refer to FIG. 1, which schematically illustrates a system employing an automatic switching device according to an embodiment of the present invention. As shown in FIG. 1, the automatic switching device 1 is respectively coupled to a video source device 2, a display device 3 and USB devices 4a-4c. The video source device 2 is coupled to the input end of the automatic switching device 1 via a first transmission cable (such as a USB Type-C cable) L1. The display device 3 is coupled to the output end of the automatic switching device 1 via a second transmission cable (such as a DisplayPort (DP) or High-Definition Multimedia Interface (HDMI) cable) L2. The USB devices 4a-4c are coupled to the output end of the automatic switching device 1 via third transmission cables (such as USB cables) L3.

In practical applications, the video source device 2 may be a notebook computer, smart phone, or other electronic devices that can provide video data. The display device 3 may be a television set, a liquid crystal display (LCD) screen, or other electronic devices that can display video images. The USB devices 4a-4c may include a keyboard, mouse, portable hard drive, or other USB devices. It should be noted that the numbers of display device 3 and USB devices 4a-4c coupled to the automatic switching device 1 may be one or more, depending on practical needs, and not limited to the numbers shown.

Figure 2:
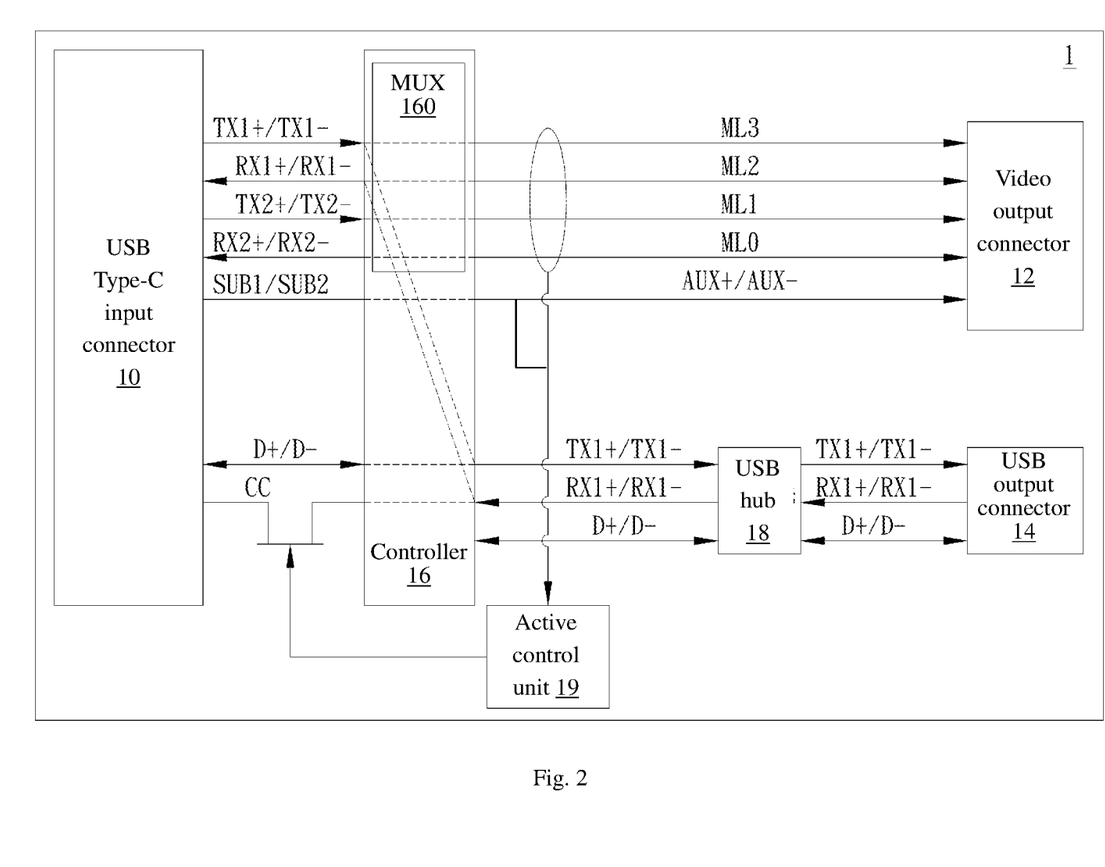
FIG. 2 is a functional block diagram of an automatic switching device according to an embodiment of the present invention.

Refer to FIG. 2, which is a functional block diagram of an automatic switching device according to an embodiment of the present invention. As shown in FIG. 2, the automatic switching device 1 includes a USB Type-C input connector 10, at least one video output connector 12 (such as a DisplayPort connector or HDMI connector), at least one USB output connector 14 (such as USB Type-A connector), a controller 16, a USB hub 18, an active control unit 19, a configuration channel CC, and multiple main links ML0-ML3. The controller 16 includes a multiplexer 160.

The USB Type-C input connector 10 is disposed at the input side of the automatic switching device 1 and configured to be coupled to the first transmission cable L1. The at lest one video output connector 12 and the at least one USB output connector 14 are disposed at the output side of the automatic switching device 1 and are respectively configured to be coupled to the second transmission cable L2 and the third transmission cables L3. The controller 16 is coupled to the USB Type-C input connector 10, the at least one video output connector 12 and the USB hub 18. The input end of the multiplexer 160 of the controller 16 is coupled to the USB Type-C input connector 10, and the output end of the multiplexer 160 is coupled to the at least one video output connector 12 via the multiple main links ML0-ML3. The USB hub 18 is coupled between the controller 16 and the at least one USB output connector 14. The configuration channel CC is coupled between the USB Type-C input connector 10 and the controller 16, to allow communication between the USB Type-C input connector 10 and the controller 16. The active control unit 19 is coupled to the configuration channel CC, to control the configuration channel CC based on the use state of the multiple main links ML0-ML3, to re-perform communication between the USB Type-C input connector 10 and the controller 16. More specifically, in one embodiment, an ON/OFF switch (e.g., a MOS switch, a transistor, or other suitable switches) is provided on the signal path of the configuration channel CC between the USB Type-C input connector 10 and the controller 16, and the active control unit 19 controls the open and closed state of the switch. The switch is normally closed, but the active control unit 19 can control the switch to be open and then closed again, which will simulate a disconnect and then re-connect of the configuration channel CC. In response to the disconnect and re-connect of the configuration channel CC, the USB Type-C input connector 10 and the controller 16 re-perform the communication between them, and as a result, the USB output connector 14 is changed to a different specification. In actual implementation, the active control unit 19 may be a microprocessor unit (MCU), a central processing unit (CPU) or a field-programmable gate array (FPGA).

More specifically, the signal transmitted between the USB Type-C input connector 10 and the controller 16 includes at least four pairs of differential signals, which are, respectively, two pairs of differential signals TX1± and TX2± transmitted from the USB Type-C input connector 10 to the controller 16, and two pairs of differential signals RX1± and RX2± transmitted from the controller 16 to the USB Type-C input connector 10. The main function of the multiplexer 160 is to selectively switch the transmission paths of the above four pairs of differential signals TX1±, TX2±, RX1± and RX2± based on different use situations. For example, in a first use situation (high display resolution), the multiplexer 160 switches the four pairs of differential signals TX1±, TX2±, RX1± and RX2± to be coupled respectively to the four main links ML0-ML3, so that all four main links ML0-ML3 are simultaneously used for signal transmission. In this situation, only the original one pair of data differential signal D± is transmitted between the controller 16 and the USB hub 18. Thus, the USB output connector 14 only needs to use USB 2.0 specification to transmit the one pair of data differential signal D±. In a second use situation (low display resolution), the multiplexer 160 switches two pairs of differential signals TX1± and RX1± to the USB hub 18, while the other two pairs of differential signals TX2± and RX2± are still coupled to two of the main links ML0-ML1. In this situation, among the four main links ML0-ML3, only two main links ML0-ML1 are used to transmit data; whereas between the controller 16 and the USB hub 18, in addition to the original one pair of data differential signal D±, two pairs of differential signals TX1± and RX1± are also transmitted. Thus, the USB output connector 14 needs to use USB 3.0 specification to transmit one pair of data differential signal D± and two pairs of differential signals TX1± and RX1±. Here, "low display resolution" and "high display resolution" are relative to each other and are not limited to specific resolution values.

It should be noted that the main links ML0-ML3 coupled between the controller 16 and the video output connector 12 may be implemented by, for example and without limitation, four pairs of differential signal lines. Note that "Main Link" is a term used in the DisplayPort specification, where multiple pairs of signal lines are collectively referred to as the Main Link and each pair is referred to as a "lane" of the Main Link. In this disclosure, each lane, i.e. each pair of differential signal lines, is referred to as one main link. It should also be noted that although DisplayPort is used as an example, the invention is not limited to DisplayPort; thus, the term main link may also generally refer to any data signal line. The automatic switching device of this embodiment can, based on the different use state of the four main links ML0-ML3, control the configuration channel CC to re-perform communication between the USB Type-C input connector 10 and the 16, so as to automatically change the USB output connector 14 to the corresponding specification, such as USB 3.0 specification or USB 2.0 specification, in order to transmit the USB signal to the USB devices 4a-4c.

In practice, the different use state of the main links ML0-ML3 refers to the number N of pairs of differential signal lines among the four pairs of differential signal lines that are currently used to transmit video data, where N equals 1, 2, or 4. In other words, in different use situations, among the four pairs of differential signal lines that constitute the main links ML0-ML3, it is possible that only one pair of differential signal lines is being used to transmit video data, or two pairs of differential signal lines are being used to transmit video data, or all fours pairs of differential signal lines are being used simultaneously to transmit video data. When only one pair or two pairs of differential signal lines are being used to transmit video data, the situation corresponds to the first use situation where low resolution image display is used. When four pairs of differential signal lines are being used simultaneously to transmit video data, the situation corresponds to the second use situation where high resolution image display is used.

Based on the use state of the multiple main links ML0-ML3, the automatic switching device 1 automatically switches the specification of the USB output connector 14 in a manner described below.

Figure 3:
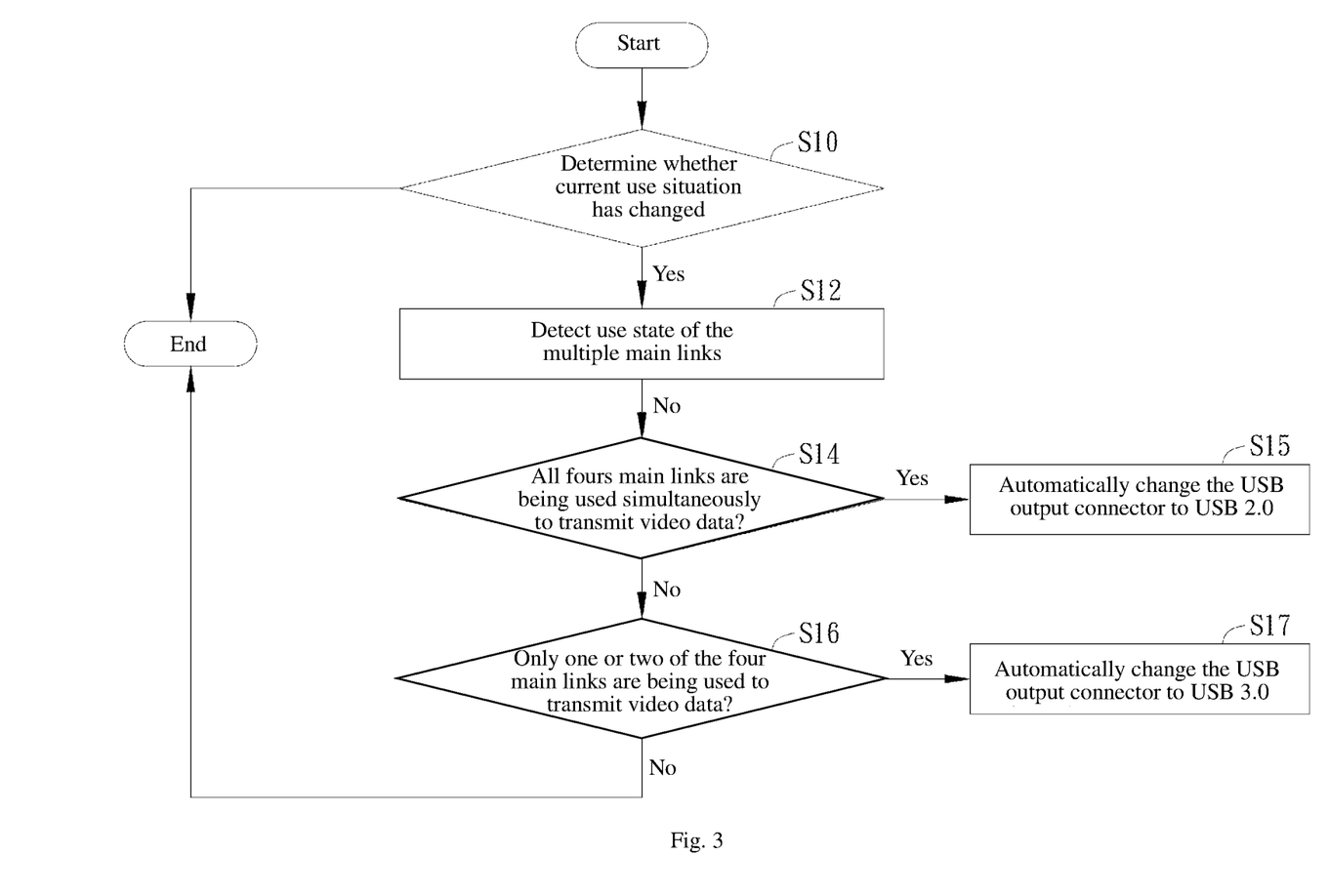
FIG. 3 is a flow chart illustrating an automatic switching method according to an embodiment of the present invention.

Refer to FIG. 3, which is a flow chart illustrating an automatic switching process according to an embodiment of the present invention.

As shown in FIG. 3, first, the process executes step S10, which determines whether the current use situation (e.g. the resolution of the video display) has changed. If the determination result is Yes, it means that the current use situation (e.g. the resolution of the video display) has changed, but this step does not determine whether the use situation has changed from a high display resolution to a low display resolution, or changed from a low display resolution to a high display resolution. Thus, the process executes step S12, which detects the use state of the multiple main links ML0-ML3.

Then, the process executes step S14, which determines whether all fours main links ML0-ML3 are being used simultaneously to transmit video data. In one embodiment, this step is achieved by the active control unit 19 accessing the DisplayPort Configuration Data (DPCD) register of the display device (which is connected to the video output connector 12) via the AUX channel to obtain the number of main links currently being used to transmit video data. In another embodiment, the active control unit 19 monitors the communication on the AUX channel between the input connector 10 and the video output connector 12 to obtain information about the number of main links currently being used to transmit video data.

If the determination result of step S14 is Yes, it means that the current use situation is the second use situation which employs high display resolution. Then, the process executes step S15, in which the active control unit 19 controls the configuration channel CC to re-perform communication between the USB Type-C input connector 10 and the controller 16, such that the controller 16 can automatically change the USB output connector 14 to the corresponding USB 2.0 specification and to use USB 2.0 specification to transmit USB signal to the USB devices 4a-4c.

If the determination result of step S14 is No, then the process executes step S16, which determines, based on the detection result of step S12, whether only one or two among the four main links ML0-ML3 are being used to transmit video data.

If the determination result of step S16 is Yes, it means that the current use situation is the first use situation which employs low display resolution. Then, the process executes step S17, in which the active control unit 19 controls the configuration channel CC to re-perform communication between the USB Type-C input connector 10 and the controller 16, such that the controller 16 can automatically change the USB output connector 14 to the corresponding USB 3.0 specification and to use USB 3.0 specification to transmit USB signal to the USB devices 4a-4c.

If the determination result of step S16 is No, it means that none of the four main links ML0-ML3 are being used to transmit video data.

Figure 4:
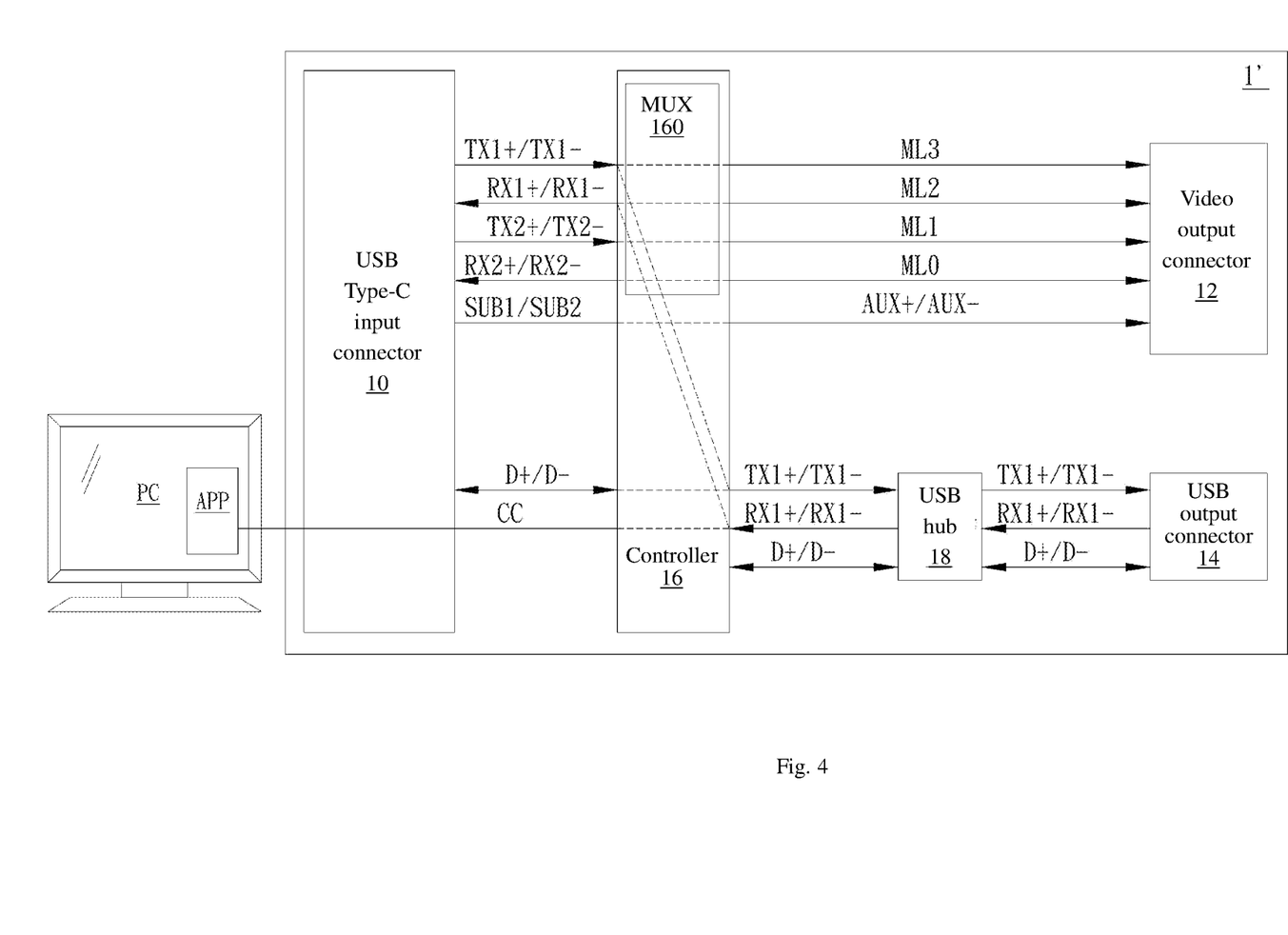
FIG. 4 is a functional block diagram of an automatic switching device according to another embodiment of the present invention.

In the above described embodiment, the steps are performed by the active control unit 19, which controls the configuration channel CC to re-perform communication between the USB Type-C input connector 10 and the controller 16. In an alternative embodiment, as shown in FIG. 4, the USB Type-C input connector 10 can also be coupled to an external electronic device PC, and the external electronic device PC, by executing an application program APP, controls the configuration channel CC to re-perform communication between the USB Type-C input connector 10 and the controller 16, such that the controller 16 can automatically change the USB output connector 14 to the corresponding USB 3.0 specification or USB 2.0 specification, without requiring the user to manually perform the complex process of re-setting and unplugging/re-plugging the transmission cable. In this embodiment, the application program APP executed by the external electronic device PC accesses the DisplayPort Configuration Data (DPCD) register to obtain the number of main links currently being used to transmit video data.

For example, when the current use situation is the first use situation where low display resolution is used, the external electronic device PC executes the application program APP to control the configuration channel CC to re-perform communication between the USB Type-C input connector 10 and the controller 16, such that the controller 16 can automatically change the USB output connector 14 to the USB 3.0 specification; when the current use situation is changed to the second use situation where high display resolution is used, the external electronic device PC executes the application program APP to control the configuration channel CC to re-perform communication between the USB Type-C input connector 10 and the controller 16, such that the controller 16 can automatically change the USB output connector 14 to the USB 2.0 specification. In one embodiment, the application program APP controls the configuration channel CC to re-perform communication between the USB Type-C input connector 10 and the controller 16 by simulating a disconnect and re-connect of the configuration channel CC.

Compared to conventional technologies, by using the automatic switching device and automatic switching method according to embodiments of the present invention, the user does not need to manually perform the complex process of re-setting and unplugging/re-plugging the transmission cables, and the device can automatically accomplish switching of the use situations when the user adjusts the resolution of the display device. This not only effectively simplifies the operation process and shorten operation time, but also provides convenience to the user in practical use.

The above detailed descriptions of the preferred embodiments are provided to clearly describe the features and characteristics of the invention; the embodiments do not limit the scope of the invention. It will be apparent to those skilled in the art that various modification and variations can be made in the automatic switching apparatus and related method of the present invention without departing from the spirit or scope of the invention. Thus, it is intended that the present invention cover modifications and variations that come within the scope of the appended claims and their equivalents.

What is claimed is:

1. An automatic switching method implemented in an automatic switching device, wherein the automatic switching device comprises a Universal Serial Bus (USB) Type-C input connector, a plurality of main links, at least one video output connector coupled to the USB Type-C input connector by the plurality of main links, and at least one USB output connector coupled to the USB Type-C input connector, the automatic switching method comprising:
   (a) detecting a use state of the plurality of main links, wherein the use state specifies a number of main links among the plurality of main links that are currently used to transmit video data; and
   (b) based on a detecting result from step (a), automatically changing a communication specification of the at least one USB output connector.

2. The automatic switching method of claim 1, wherein the at least one video output connector includes a DisplayPort connector, configured for coupling to a display device, and wherein the plurality of main links include four pairs of differential signal lines, the four pairs of differential signal lines being coupled to the DisplayPort connector.

3. The automatic switching method of claim 2, wherein the detecting result from step (a) specifies a number N of pairs of differential signal lines among the four pairs of differential signal lines that are currently used to transmit video data, wherein N equals 1, 2, or 4.

4. The automatic switching method of claim 3, wherein when N equals 1 or 2, which indicates a first use situation where a low display resolution is used for image display, step (b) includes automatically changing the communication specification of the at least one USB output connector to USB 3.0 specification.

5. The automatic switching method of claim 3, wherein when N equals 4, which indicates a second use situation where a high display resolution is used for image display, step (b) includes automatically changing the communication specification of the at least one USB output connector to USB 2.0 specification.

6. The automatic switching method of claim 2, wherein the automatic switching device further comprises a controller and a configuration channel, wherein the controller is coupled to the USB Type-C input connector, the four pairs of differential signal lines and the at least one USB output connector, and wherein the configuration channel is coupled between the USB Type-C input connector and the controller.

7. The automatic switching method of claim 6, wherein step (b) includes, based on the detecting result from step (a), controlling the configuration channel to re-perform communication between the USB Type-C input connector and the controller to automatically change the communication specification of the at least one USB output connector.

8. The automatic switching method of claim 7, wherein the automatic switching device further comprises an active control unit coupled to the configuration channel, and wherein step (b) includes the active control unit controlling the configuration channel to re-perform the communication.

9. The automatic switching method of claim 8, wherein the active control unit includes a microprocessor unit (MCU), a central processing unit (CPU), or a field-programmable gate array (FPGA).

10. The automatic switching method of claim 7, wherein the USB Type-C input connector is coupled to an external electronic device, and wherein step (b) includes the external electronic device executing an application program to control the configuration channel to re-perform the communication.

11. The automatic switching method of claim 2, wherein the automatic switching device is a docking station, operating under a DisplayPort Alternate Mode, for receiving video data and USB data via the USB Type-C input connector, and transmitting the video data and the USB data respectively via the at least one video connector and at the least one USB output connector.

12. An automatic switching device, comprising:
   a Universal Serial Bus (USB) Type-C input connector, disposed at an input side of the automatic switching device;
   at least one video output connector, disposed at an output side of the automatic switching device;
   at least one USB output connector, disposed at the output side of the automatic switching device and coupled to the USB Type-C input connector; and
   a plurality of main links coupled between the USB Type-C input connector and the at least one video output connector;
   wherein the automatic switching device is configured to, based on a use state of the plurality of main links, wherein the use state specifies a number of main links among the plurality of main links that are currently used to transmit video data, automatically changing a communication specification of the at least one USB output connector.

13. The automatic switching device of claim 12, wherein the at least one video output connector includes a DisplayPort connector, and wherein the plurality of main links include four pairs of differential signal lines, the four pairs of differential signal lines being coupled to the DisplayPort connector.

14. The automatic switching device of claim 13, wherein the use state of the plurality of main links specifies a number N of pairs of differential signal lines among the four pairs of differential signal lines that are currently used to transmit video data, wherein N equals 1, 2, or 4.

15. The automatic switching device of claim 14, wherein when N equals 1 or 2, which indicates a first use situation where a low display resolution is used for image display, the automatic switching device automatically changes the communication specification of the at least one USB output connector to USB 3.0 specification.

16. The automatic switching device of claim 14, wherein when N equals 4, which indicates a second use situation where a high display resolution is used for image display, the automatic switching device automatically changes the communication specification of the at least one USB output connector to USB 2.0 specification.

17. The automatic switching device of claim 13, further comprising:
   a controller coupled to the USB Type-C input connector, the four pairs of differential signal lines and the at least one USB output connector; and
   a configuration channel, coupled between the USB Type-C input connector and the controller.

18. The automatic switching device of claim 17, wherein the automatic switching device is configured to, based on the use state of the plurality of main links, control the configuration channel to re-perform communication between the USB Type-C input connector and the controller to automatically change the communication specification of the at least one USB output connector.

19. The automatic switching device of claim 18, further comprising:
   an active control unit coupled to the configuration channel, for controlling the configuration channel to re-perform the communication.

20. The automatic switching device of claim 19, wherein the active control unit includes a microprocessor unit (MCU), a central processing unit (CPU), or a field-programmable gate array (FPGA).

21. The automatic switching device of claim 18, wherein the USB Type-C input connector is coupled to an external electronic device, the external electronic device being configured to execute an application program to control the configuration channel to re-perform the communication.

22. The automatic switching device of claim 12, wherein the automatic switching device is a docking station, operating under a DisplayPort Alternate Mode, for receiving video data and USB data via the USB Type-C input connector, and transmitting the video data and the USB data respectively via the at least one video connector and at the least one USB output connector.

* * * * *